United States Patent Office 3,849,548
Patented Nov. 19, 1974

3,849,548
COSMETIC COMPOSITIONS
Paul Sheldon Grand, South Bound Brook, N.J., assignor to Colgate-Palmolive Company, New York, N.Y.
No Drawing. Filed Nov. 16, 1970, Ser. No. 90,153
Int. Cl. A61k 7/06
U.S. Cl. 424—70                                17 Claims

ABSTRACT OF THE DISCLOSURE

A method of improving the cosmetic condition of the hair, skin or the like which comprises the step of applying thereto a composition comprising an aminopolyurea resin in a compatible, nontoxic, cosmetic vehicle and the compositions applied in the foregoing method. Particularly preferred are the compositions wherein the vehicle is a cleansing composition or a hair-grooming composition.

Disclosure

The present invention relates to a method of improving the cosmetic condition of the skin and hair which comprises the step of applying thereto a composition comprising an aminopolyurylene (APU) resin in a compatible, nontoxic, cosmetic vehicle. The described method may result in a number of desired properties, including desired modification or treatment of the surface of the hair and of the skin to improve the feel and the slip, and inhibiting the growth of various microorganisms, such as *Staphylococcus aureus* and *Pityrosporum ovale*.

The APU resins employed in the desired method have been discovered to possess antimicrobial properties and to be skin substantive when formulated in a nontoxic, compatible cosmetic vehicle. APU resins suitable for use in the described method and compositions are polymeric resins characterized by the following repeating unit:

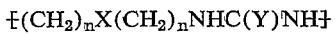

wherein X is NH, N–$C_1$ to $C_{22}$ alkyl,

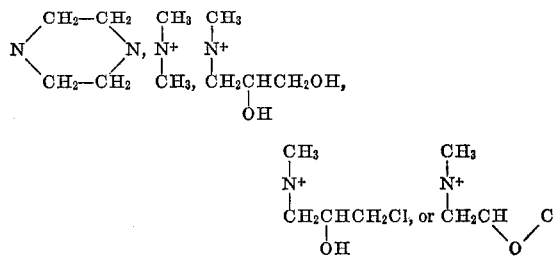

Y is O or S, and $n$ is 2 or 3.

Thus, suitable APU resins include both the polyurea- and the polythiourea-containing compounds. Preferred APU resins have a repeating unit where Y is oxygen, $n$ is 3, and X is selected from the group consisting of N—$C_{1-8}$ alkyl and

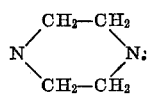

Generally, the number of repeating units in the resin will be sufficient to yield a polymer having a molecular weight in the range of about 300 to 100,000. Preferred APU resins have an average molecular weight in the range of 1,000 to 20,000; and a particularly preferred resin is the reaction product of equimolar quantities of N-methyl, bis(3-aminopropyl) amine and urea having a molecular weight of about 4300.

The molecular weight of the APU resins is based upon aqueous gel permeation chromatographic analysis. The separation is carried out in oxalic acid solution, adjusted to pH 3.5, on three Corning controlled-pore glass columns (nominal pore sizes 175, 125, and 75 A.) in series. Detection is by differential refractometer. Reference compounds are dextran polysaccharides of molecular weights of 150,000, 110,000, 40,000, and 10,000 and sucrose and galactose.

The APU polymers which can be used in the compositions of this invention are prepared by reacting, for example, 145 grams of N-methyl bis(3-aminopropyl)amine (1.0 mole) and 60 grams of urea (1.0 mole) in a 3-necked flask equipped with a thermometer, mechanical stirrer, condenser, and nitrogen sparge tube. Nitrogen is bubbled slowly through the solution throughout the course of the reaction. The solution is heated to 140° C. over a 20-minute interval where ammonia begins to evolve. The solution is further heated to 250° C. over a 30-minute interval and allowed to cool. The product is a hard, resinous powder (Resin A) having a molecular weight of about 4300. An aqueous solution containing 47.6 percent solids has an intrinsic viscosity of 0.150 when measured as a 2 percent solution in 1N ammonium chloride at 25° F. The secondary amine analogues can be made by the above process if bis(3-aminopropyl) amine or bis(2-aminoethyl) amine are reacted with urea or thiourea. The piperazine analogues are made by reacting N, N'-di(3-aminopropyl) piperazine or N,N'-di(2-aminoethyl) piperazine with urea or thiourea. The N—$C_1$ to $C_{22}$ alkyl analogues are prepared by reacting $C_1$ to $C_{22}$ alkyl bis(3-aminopropyl) amine or $C_1$ to $C_{22}$ alkyl bis(2-aminoethyl) amine with urea or thiourea. Additional analogues are prepared by the following reactions:

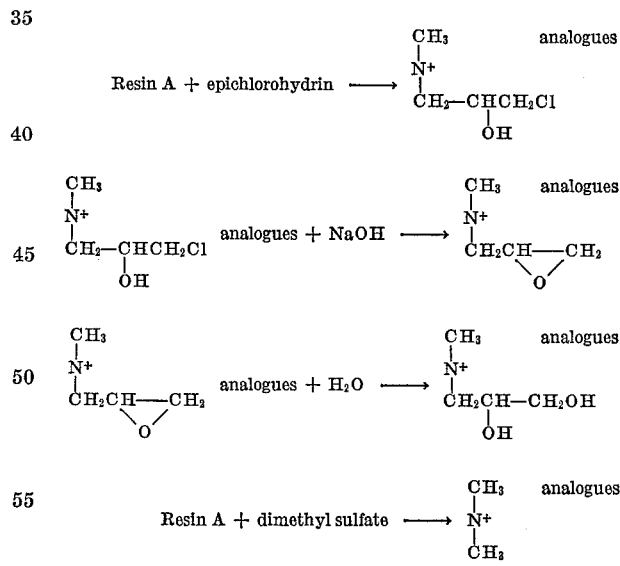

The preparation of the other suitable analogues is well within the skill of the art following the above techniques.

The microbial effectiveness of the APU resins was determined using the "Test Tube Serial Dilution Method" described on pages 195–200 of the Fifth Edition of "Diagnostic Bacteriology" by Schaub et al. Table I sets forth the "minimum inhibitory concentration" (MIC) as determined using the aforementioned method against *Staph. aureus* and *P. ovale* of an APU resin (Resin A) having a molecular weight of 4300 wherein the repeating unit is $+(CH_2)_3N(CH_3)(CH_2)_3NHC(O)NH+$. Values for well known microbial materials are included for purposes of comparison.

TABLE I

| Test composition | MIC in micrograms per milliliter (μg./ml.) | |
|---|---|---|
| | Staph. aureus | P. ovale |
| 1% resin A in water | 15.6 | 3.9 |
| 1% resin A in ethanol | — | 1.9 |
| 1% bis(3,5,6-trichloro-2-hydroxyphenyl) methane in ethanol | 0.5 | 500 |
| 1% 3,4,4' trichlorocarbanilide in ethanol | 0.1 | 500 |

The foregoing results are surprising in view of the fact that the antimicrobial properties of APU resins were unknown and their effectiveness against *P. ovale* is not generally characteristic of other agents known to be effective against *Staph. aureus*.

MIC results against *P. ovale* for 1% aqueous solutions of other listed APU resins is set forth in Table II.

TABLE II

| Polymer Repeating unit | Molecular weight | MIC (μg. ml.) |
|---|---|---|
| $-[-(CH_2)_3N\!\!<\!\!\genfrac{}{}{0pt}{}{CH_2-CH_2}{CH_2-CH_2}\!\!>\!\!N(CH_2)_3NHC(O)NH-]-$ | 5,700 | 3. |
| $-[-(CH_2)_3-\underset{\underset{OH}{\underset{\|}{CH_2CHCH_2Cl}}}{\overset{\overset{CH_3}{\|}}{N^+}}(CH_2)_3NHC(O)NH-]-$ | 6,700 | 15.6 |
| $-[-(CH_2)_3\underset{\underset{CH_2CH-CH_2}{\underset{\|}{\phantom{x}}\diagdown O \diagup}}{\overset{\overset{CH_3}{\|}}{N^+}}-(CH_2)_3NHC(O)NH-]-$ | 5,700 | 15.6 |
| $-[-(CH_2)_3\underset{\underset{CH_2CH(OH)CH_2OH}{\|}}{\overset{\overset{CH_3}{\|}}{N^+}}(CH_2)_3NHC(O)NH-]-$ | 6,200 | 15.6 |
| $-[-(CH_2)_3\underset{\underset{CH_3}{\|}}{\overset{\overset{CH_3}{\|}}{N^+}}(CH_2)_3NHC(O)NH-]-$ | 4,700 | 4.8 |

The same testing technique was employed to determine antimicrobial effectiveness of APU resins in the presence of water soluble organic detergents and such tests confirm that APU resins exhibit antimicrobial effectiveness against *P. ovale* in the presence of detergents.

In addition to their antimicrobial effectiveness, the APU resins have been found to be substantive to proteinaceous substrates, such as hair and skin. Substantivity was determined by stirring a half-inch diameter circular gelatin disk weighing about 40 milligrams in 10 grams of 1% by weight of radioactive (C–14 tagged) APU resin, rinsing the disk five times in 10 milliliters of water and measuring the radioactive emission with the aid of a radiation detector. These tests showed the APU resin to be significantly more substantive than the well-known antimicrobial compounds listed in Table I above. Further, similar tests show that the APU resins retain their substantivity even in the presence of water-soluble synthetic organic detergents, and this property is quite surprising because generally antimicrobial effectiveness tends to be destroyed or seriously impaired because of the adverse effect of detergents on substantivity. When a tress of hair weighing 0.55 grams was substituted for the gelatin disk in the foregoing test, similar substantivity results were obtained in the presence of detergents.

In view of their antimicrobial effectiveness and of their substantivity, the described APU resins are particularly suitable for improving the condition of the hair and skin. More particularly, the subject resins may be incorporated into a nontoxic, compatible cosmetic vehicle to form a cosmetic composition for application to the hair and skin to improve the condition thereof.

The resultant cosmetic compositions of the present invention may be prepared in a wide variety of physical forms. They may be liquids, pastes or solids and may consist of a single aqueous or aqueous-alcoholic phase, or may comprise an aqueous and a separate oily phase as in two-layer systems or emulsions of the water-in-oil or oil-in-water types. By suitable selections of the nontoxic compatible cosmetic vehicle, it is contemplated that the present cosmetic compositions may be prepared in the form of daily skin or hair conditioning products such as skin lotions or hair conditioning rinses, daily hair-grooming products, such as hair lotions, hair dressings, hair tonics, and the like, or they may be prepared in the form of cleansing products, such as hair shampoos.

The APU resins will constitute generally a minor proportion, on the order of about 0.10 percent to 10 percent by weight of the compositions, but the proportion will vary depending on the nature of the product. For example, such proportions of resin have resulted in effective liquid skin and hair conditioning products and hair grooming compositions, but concentrations in the range of 0.5 percent to 3.0 percent by weight are preferred for such products. On the other hand, concentrations of resin in the range of 1 percent to 10 percent, preferably 1 percent to 5 percent, by weight, are preferred for solid and liquid cleansing compositions.

The vehicle accounts for the balance of about 90 percent to 99.9 percent by weight of the cosmetic skin and hair compositions, and its specific composition will vary according to the end use of the composition. Thus the vehicle in single-phase, liquid, hair- or skin-conditioning compositions may be water, a $C_2$–$C_3$ lower monohydric or polyhydric alcohol or a mixture thereof. Where a liquid hair-grooming composition results, the vehicle will contain from about 0.5 percent to 65 percent by weight of a nonvolatile hair-grooming agent and from 25 to 99.4 percent by weight of aqueous solvent, such as water or mixtures of water and ethanol or isopropyl alcohol. In liquid cleansing compositions, such as shampoos, the vehicle will generally contain about 5 to 40 percent, preferably 10 to 30 percent by weight of a compatible, water-soluble synthetic organic detergent. On the other hand, in solid, powder, or cream cleansing compositions the vehicle may contain from about 15 to 95 percent by weight of the organic detergent and a balance of water and/or other components. The proportions of all vehicle compositions are expressed as percent by weight of the total composition.

In the case of cleansing compositions for the hair and skin, such as shampoo, the vehicle includes a cleansing agent which is a water-soluble synthetic organic detergent. Suitable detergents may be selected from the group consisting of anionic, nonionic, amphoteric, zwitterionic, polar nonionic, and cationic detergents, and mixtures of two or more of the foregoing detergents.

The compatible anionic surface active agents include those surface active or detergent compounds which contain an organic hydrophobic group containing generally 8 to 26 carbon atoms and preferably 10 to 18 carbon atoms in their molecular structure, and at least one water-solubilizing group selected from the group of sulfonate, sulfate, carboxylate, phosphonate and phosphate so as to form a water-soluble detergent.

Examples of suitable anionic detergents which fall within the scope of the anionic detergent class include the water-soluble salts, e.g., the sodium, ammonium, and alkylolammonium salts, of higher fatty acids or resin salts containing about 8 to 20 carbon atoms, preferably 10 to 18 carbon atoms. Suitable fatty acids can be obtained from oils and waxes of animal or vegetable origin, e.g., tallow, grease, coconut oil, tall oil and mixtures thereof. Particularly useful are the sodium and potassium salts of the fatty acid mixtures derived from coconut oil and tallow, e.g., sodium coconut soap and potassium tallow soap.

The anionic class of detergents also includes the water-soluble sulfated and sulfonated synthetic detergents having an alkyl radical of 8 to 26, and preferably about 12 to 22 carbon atoms, in their molecular structure. (The term alkyl includes the alkyl portion of the higher acyl radicals.)

Examples of the sulfonated anionic detergents are the higher alkyl mononuclear aromatic sulfonates such as the higher alkyl benzene sulfonates containing from 10 to 16 carbon atoms in the higher alkyl group in a straight or branched chain, e.g., the sodium, potassium and ammonium salts of higher alkyl benzene sulfonates, higher alkyl toluene sulfonates, higher alkyl phenol sulfonates, and higher naphthalene sulfonates. A preferred sulfonate is linear alkyl benzene sulfonate having a high content of 3- (or higher) phenyl isomers and a correspondingly low content (well below 50 percent) of 2- (or lower) phenyl isomers, i.e., wherein the benzene ring is preferably attached in large part at the 3 or higher (e.g., 4, 5, 6 or 7) position of the alkyl group and the content of isomers in which the benzene ring is attached at the 2 or 1 position is correspondingly low. Particularly preferred materials are set forth in U.S. Pat. 3,320,174.

Other suitable anionic detergents are the olefin sulfonates, including long-chain alkene sulfonates, long-chain hydroxyalkane sulfonates or mixtures of alkene-sulfonates and hydroxylalkane-sulfonates. These olefin sulfonate detergents may be prepared in a known manner by the reaction of $SO_3$ with long-chain olefins containing 8 to 25, preferably 12–21, carbon atoms and having the formula $RCH=CHR_1$ where R is a higher alkyl group of 6 to 23 carbons and $R_1$ is an alkyl group of 1 to 17 carbons or hydrogen to form a mixture of sultones and alkene-sulfonic acids which is then treated to convert the sultones to sulfonates. Other examples of sulfate or sulfonate detergents are paraffin sulfonates containing about 10–20, preferably about 15–20, carbon atoms, e.g., the primary paraffin sulfonates made by reacting long-chain alpha olefins and bisulfites and paraffin sulfonates having the sulfonate groups distributed along the paraffin chain as shown in U.S. Pats. 2,503,280; 2,507,088; 3,260,741; 3,372,188 and German Pat. 735,096; sodium and potassium sulfates of higher alcohols containing 8 to 18 carbon atoms such as sodium lauryl sulfate and sodium tallow alcohol sulfate; sodium and potassium salts of α-sulfofatty acid esters containing about 10 to 20 carbon atoms in the acyl group, e.g., methyl α-sulfomyristate and methyl α-sulfotallowate, ammonium sulfates of mono- or diglycerides of higher ($C_{10}$–$C_{18}$) fatty acids, e.g., stearic monoglyceride monosulfate; sodium and alkylolammonium salts of alkyl polyethenoxy ether sulfates produced by condensing 1 to 5 moles of ethylene oxide with one mole of higher ($C_8$–$C_{18}$) alcohol; sodium higher alkyl ($C_{10}$–$C_{18}$) glyceryl ether sulfonates; and sodium or potassium alkyl phenol polyethenoxy ether sulfates with about 1 to 6 oxyethylene groups per molecule and in which the alkyl radicals contain about 8 to about 12 carbon atoms.

The suitable anionic detergents include also the $C_8$–$C_{18}$ acyl sarcosinates (e.g. sodium lauroyl sarcosinate), sodium and potassium salts of the reaction product of higher fatty acids containing 8 to 18 carbon atoms in the molecule esterified with isethionic acid, and sodium and potassium salts of the $C_8$–$C_{18}$ acyl N-methyl taurides, e.g., sodium cocoyl methyl taurate and potassium stearoyl methyl taurate.

Anionic phosphate surfactants in which the anionic solubilizing group attached to the hydrophobic group is an oxyacid of phosphorous are also useful in the detergent compositions. Suitable phosphate surfactants are the sodium potassium and ammonium alkyl phosphate esters such as $(R-O)_2PO_2M$ and $ROPO_3M_2$ in which R represents an alkylchain containing from about 8 to about 20 carbon atoms or an alkyl phenyl group having 8 to 20 carbon atoms and M represents a soluble cation. The compounds formed by including about one to 40 moles of ethylene oxide in the foregoing esters, e.g., $[R-O(EtO)_n]_2PO_2M$, are also satisfactory.

The particular anionic detergent salt will be suitably selected depending upon the particular formulation and the proportions therein. Suitable salts include the ammonium, substituted ammonium (mono-, di- and triethanolammonium), alkali metal (such as sodium and potassium) and alkaline earth metal (such as calcium and magnesium) salts. Preferred salts are the ammonium, triethanolammonium, sodium and potassium salts of the higher alkyl sulfates and the $C_{8-18}$ acyl sarcosinates.

The nonionic synthetic organic detergents are generally the condensation product of an organic aliphatic or alkyl aromatic hydrophobic compound and hydrophilic ethylene oxide groups. Practically any hydrophobic compound having a carboxy, hydroxy, amido, or amino group with a free hydrogen attached to the nitrogen can be condensed with ethylene oxide or with the polyhydration product thereof, polyethylene glycol, to form a nonionic detergent. Further, the length of the polyethenoxy chain can be adjusted to achieve the desired balance between the hydrophobic and hydrophilic elements.

The nonionic detergents include the polyethylene oxide condensate of one mole of alkyl phenol containing from about 6 to 12 carbon atoms in a straight- or branched-chain configuration with about 5 to 30 moles of ethylene oxide, e.g., nonyl phenol condensed with 9 moles of ethylene oxide, dodecyl phenol condensed with 15 moles of ethylene oxide and dinonyl phenol condensed with 15 moles of ethylene oxide. Condensation products of the corresponding alkyl thiophenols with 5 to 30 moles of ethylene oxide are also suitable.

Still other suitable nonionics are the polyoxyethylene polyoxypropylene adducts of 1-butanol. The hydrophobe of these nonionics has a minimum molecular weight of 1,000 and consists of an aliphatic monohydric alcohol containing from 1 to 8 carbon atoms to which is attached a heteric chain of oxyethylene and oxypropylene. The weight ratio of oxypropylene to oxyethylene covers the range of 95:5 to 85:15. Attached to this is the hydrophilic polyoxyethylene chain which is from 44.4 to 54.6 percent of the total molecular weight of 1,400 to 4,000.

Also included in the nonionic detergent class are the condensation products of a higher alcohol containing about 8 to 18 carbon atoms in a straight or branched-chain configuration condensed with about 5 to 30 moles of ethylene oxide, e.g., lauryl-myristyl alcohol condensed with about 16 moles of ethylene oxide.

A particularly useful group of nonionics is marketed under the trade name "Pluronics." The compounds are formed by condensing ethylene oxide with a hydrophobic base formed by the condensation of propylene oxide with propylene glycol. The molceular weight of the hydrophobic portion of the molecule is of the order of 950 to 4000 preferably 1200 to 2500. The addition of polyoxyethylene radicals to the hydrophobic portion tends to increase the solubility of the molecule as a whole. The molecular weight of the block copolymers varies from 1100 to 15,000 and the polyethylene oxide content may comprise 20 to 80 percent by weight.

Other suitable nonionics may be derived by the condensation of ethylene oxide with the product resulting from the reaction of propylene oxide and ethylene diamine. The molecular weight varies from 500 to 4,500.

Other nonionic detergents include the ethylene oxide addends of monoesters of hexahydric alcohols and inner ethers thereof with higher fatty acids containing about 10 to 20 carbon atoms, e.g., sorbitan monolaurate, sorbitan mono-oleate, and mannitan monopalmitate.

The amphoteric detergents which can be used in the compositions of this invention are generally water-soluble salts of derivatives of aliphatic amines which contain at least one cationic group, e.g., non-quaternary nitrogen, quaternary ammonium, or quaternary phosphonium group, at least one alkyl group of about 8 to 18 carbon atoms and an anionic water-solubilizing carboxyl, sulfo, sulfato, phosphato or phosphono group in their molecular structure. The alkyl group may be straight chain or branched and the specific cationic atom may be part of a heterocyclic ring.

Examples of suitable ampholytic detergents include the alkyl beta-aminopropionates, $RN(H)C_2H_4COOM$; the alkyl beta - iminodipropionates, $RN(C_2H_4COOM)_2$; the alkyl and hydroxyl alkyl taurinates, $RN(CH_3)C_2H_4SO_3M$; and the long-chain imidazole derivatives having the following formulas:

(I) 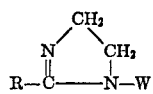

(II) 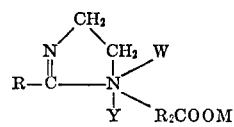

wherein R is an acyclic group of about 7 to 17 carbon atoms, W is selected from the group of $R_2OH$, $R_2COOM$, and $R_2OR_2COOM$, Y is selected from the group consisting of $OH^-$, $R_3OSO_3^-$, $R_2$ is an alkylene or hydroxyalkylene group containing 1 to 4 carbon atoms, $R_3$ is selected from the group consisting of alkyl, alkyl aryl and fatty acyl glyceride groups having 6 to 18 carbon atoms in the alkyl or an acyl group; and M is a water-soluble cation, e.g., sodium potassium, ammonium or alkylolammonium.

Formula I detergents are disclosed in Volume II of "Surface Active Agents and Detergents" and in French Patent 1,412,921 and Formula II detergents are described in U.S. 2,773,068; U.S. 2,781,354, and U.S. 2,781,357. The acylic groups may be derived from coconut oil fatty acids (a mixture of fatty acids containing 8 to 18 carbon atoms), lauric fatty acid, and oleic fatty acid and the preferred groups are $C_7$-$C_{17}$ alkyl groups. Preferred detergents are sodium N-lauryl beta-aminopropionate, disodium N-lauryl iminodipropionate, and the disodium salt of 2-lauryl-cycloimidium-1-hydroxyl, 1-ethoxyethanoic acid, 1-ethanoic acid.

Zwitterionic detergents such as the betaines and sulfobetaines having the following formula are also useful:

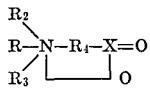

wherein R is an alkyl group containing about 10 to 18 carbon atoms, $R_2$ and $R_3$ are each $C_1$-$C_3$ alkyl, $R_4$ is an alkylene or hydroxyalkylene group containing about 1 to 4 carbon atoms, and X is C or S:O. The alkyl group can contain one or more intermediate linkages such as amido, either or polyether linkages or non-functional substituents such as hydroxyl or halogen which do not substantially affect the hydrophobic character of the group. When X is C, the detergent is called a betaine; and when X is S:O, the detergent is called a sulfobetaine or sultaine. Preferred betaine and sulfobetaine detergents are 1-(lauryl dimethylammonio) acetite, 1-(myristyl dimethylammonio)propane-3-sulfonate, and 1 - (myristyldimethylammonio)-2-hydroxy-propane-3-sulfonate.

The polar nonionic detergents are those in which the hydrophilic group contains a semi-polar bond directly between two atoms, for example, $N{\rightarrow}O$, $P{\rightarrow}O$, $As{\rightarrow}O$, and $S{\rightarrow}O$, There is charge separation between the two directly bonded atoms, but the detergent molecule bears no net charge and does not dissociate into ions.

The polar nonionic detergents of this invention include open-chain aliphatic amine oxides of the general formula $R_1R_2R_3N{\rightarrow}O$. For the purposes of this invention $R_1$ is an alkyl, alkenyl, or monohydroxyalkyl radical having about 10 to 16 carbon atoms. $R_2$ and $R_3$ are each selected from the group consisting of methyl, ethyl, propyl, ethanol, and propanol radicals.

Other operable polar nonionic detergents are the open-chain aliphatic phosphine oxides having the general formula $R_1R_2R_3P{\rightarrow}O$ wherein $R_1$ is an alkyl, alkenyl, or monohydroxyalkyl radical ranging in chain length from 10 to 18 carbon atoms, and $R_2$ and $R_3$ are each alkyl and monohydroxyalkyl radicals containing from 1 to 3 carbon atoms.

Cationic surface active agents may also be employed. Such agents are those surface active detergent compounds which contain an organic hydrophobic group and a cationic solubilizing group. Typical cationic solubilizing groups are amine and quaternary groups.

Examples of suitable synthetic cationic detergents are normal primary amines $RNH_2$ wherein R is $C_{12}$-$C_{15}$; the diamines such as those of the type $RNHC_2H_4NH_2$ wherein R is an alkyl group of about 12 to 22 carbon atoms, such as N-2-aminoethyl stearyl amine and N-2-aminoethyl myristyl amine; amide-linked amines such as those of the type $R_1CONHC_2H_4NH$ wherein $R_1$ is an alkyl group of about 8 to 20 carbon atoms, such as N-2-amino ethylstearyl amide and N-amino ethylmyristyl amide; quaternary ammonium compounds wherein typically one of the groups linked to the nitrogen atom is an alkyl group of about 8 to 22 carbon atoms and three of the groups linked to the nitrogen atom are alkyl groups which contain 1 to 3 carbon atoms, including alkyl groups bearing inert substituents, such as phenyl groups, and there is present an anion such as halogen, acetate, methosulfate, etc. The alkyl group may contain intermediate linkages such as amido which do not substantially affect the hydrophobic character of the group, e.g., stearyl amido propyl quaternary ammonium chloride. Typical quaternary ammonium detergents are ethyldimethyl-stearyl ammonium chloride, benzyl-dimethyl-stearyl ammonium chloride, trimethyl-stearyl ammonium chloride, trimethyl-cetyl ammonium bromide, dimethyl-ethyl-lauryl ammonium chloride, dimethyl-propyl-myristyl ammonium chloride, and the corresponding methosulfates and acetates.

The concentration of water-soluble organic detergent in the skin- and hair-cleansing compositions of the invention varies with the nature and form of the product, that is, usually from about 15 to 99 percent by weight in solid products, such as bars, and from 5 to 40 percent, preferably 10 to 30 percent, by weight of liquid products, such as shampoos. However, the weight ratio of water-soluble organic detergent to APU resin will generally be in the range of about 40:1 to 1:1 and preferably from about 30:1 to about 5:1. Desirably, the weight ratio of anionic detergent to the resin hsould not exceed about 10:1 where significant anti-dandruff effectiveness is desired. The balance of the vehicle in the cleansing compositions obviously also varies according to the form of the resultant product. For example, in liquid cleansing compositions the balance, e.g., 50 to 94 percent by weight, is an aqueous medium, such as water or mixtures of water with about 2 to 20 percent by weight of a monohydric or polyhydric alcohol containing 2 to 3 carbon atoms.

Coconut mono- or diethanolamides or strongly ionizing salts, such as sodium chloride and sodium sulfate, may be used in amounts up to about 15 percent, e.g., from 1 to 5 percent of the formula weight of cleansing compositions. The compounds serve to aid in the compatibilization of the resin-detergent composition. They are, however, not essential.

In the case of hair-grooming compositions, the vehicle will include a nonvolatile organic hair-grooming agent to facilitate grooming of the hair and scalp and to keep the hair in place. Examples of such agents include castor oil, mineral oil, lipophilic lower alkoxypolypropylene glycols having a molecular weight in the range of 1,000 to 2,500, such as butoxy polyoxypropylene glycols having a molecular weight of about 1,700; hydrophobic mixed polyethylene polyalkylene ($C_3$–$C_4$) glycol condensates or butanol having a molecular weight of about 400 to 4000 and containing from 35 to 65 percent by weight of polyethylene glycol, such as Ucon 50 HB 660; polyhydric alcohols containing 2 to 3 carbon atoms such as glycerol and propylene glycol; and gums, such as gum tragacanth. It is preferred to employ those substantially nonvolatile organic grooming agents which have a molecular weight of about 75, and preferably above 200, and which contain an alcoholic hydroxy group, such as the aforementioned glycols, polyhydric alcohols, polymerized alkylene oxides, and castor oil.

The concentration of the nonvolatile, organic hair-grooming agent in the hair-grooming compositions will range from 0.5 to 65 percent, preferably from 3 to 50 percent by weight of the composition. The balance of the vehicle will vary according to the form of the resultant product, and generally will be an aqueous medium, such as water or mixtures of water and a lower monohydric alcohol, such as ethanol or isopropanol. In the aqueous alcoholic mixtures, as little as 5 percent by weight of water may be present with the balance being lower alcohol. Single-phase compositions may include about 30 percent to 80 percent by weight of water; whereas, emulsion compositions generally will be free of alcohol.

The cosmetic compositions for the hair and skin may also contain as adjuvant materials various substances, such as vitamins, lanolin, bacteriocides, plant extracts, coloring agents, perfumes, thickeners such as cellulose, opacifiers, and sequestering agents in order to enhance the cosmetic or antimicrobial properties of the resultant compositions. Buffers may also be included to provide a pH of 5 to 10, and preferably above about 7.0.

The hair and skin compositions of the invention are characterized by an outstanding ability to inhibit the growth of *P. ovale*, the yeast believed to be associated with dandruff. These compositions are also substantive (remain on the hair and skin) and thereby retain bacteriostatic effectiveness over an extended period of time. Further, the compositions effectively condition the hair and skin and, depending upon their nature, are effective as hair grooming compositions or cleansing compositions.

Specific skin and hair compositions, according to the invention, are illustrated by the following examples. All quantities indicated are by weight unless otherwise indicated.

Example 1

A hair shampoo composition having the following formulation is prepared.

| | Percent |
|---|---|
| $C_{12}$–$C_{18}$ amidopropyl dimethyl betaine | 22.5 |
| Sodium N(2-hydroxy hexadecyl)N-methyl taurinate | 6.0 |
| Sodium hexyl benzene sulfonate | 0.8 |
| Lauryl dimethyl amine oxide | 0.6 |
| Resin A | 2.0 |
| Water, balance | |
| | 100.0 |

The shampoo is prepared by admixing the specified components with the calculated weight of water with agitation at a temperature in the range of 130° F. to 160° F., cooling with agitation to room temperature and adjusting the pH. The resultant product is a single-phase liquid having a pH of 9.3 and a cloud point of below 30° F. This shampoo exhibits an MIC against *P. ovale* in the aforementioned serial dilution of 0.5 µg./ml. (based on the resin).

When the composition of Example 1 is formulated with a radioactive $C_{14}$ tagged Resin A and is evaluated for substantivity, compositions having pH's of 9.3 and 7.3 are found to be substantive to both gelatin and hair.

Example 2

Substitution for Resin A in the composition of Example 1 of a resin having a molecular weight of about 5600 and prepared by reacting piperazine and urea yields an antibacterial composition having an MIC of 3.9 µg./ml. (based on the weight of the resin against *P. ovale*.

Example 3

A hair shampoo composition is prepared using the process of claim 1 having the following composition:

| | Percent |
|---|---|
| $C_8$–$C_{18}$ alkyl amidopropyl dimethyl betaine | 16.0 |
| Triethanolamine lauryl sulfate | 4.0 |
| Lauryl dimethyl amine oxide | 0.5 |
| Polyoxypropylene - polyoxyethylene block copolymer wherein the hydrophobic group has a molecular weight of 1750 and ethylene oxide is 20% by weight ("Pluronic L 62") | 5.0 |
| Resinous condensate of about 2 moles of epichlorohydrin and one mole of diethylene triamine having a molecular weight of about 80,000 | 0.5 |
| Mixed polymer having a molecular weight of about 4000 formed by condensing a 1:1 mixture of ethylene oxide and propylene oxide on butanol ("Ucon 50 HB 5100") | 2.0 |
| Resin A | 2.0 |
| Ethanol | 2.0 |
| Water, balance | |
| | 100.0 |

This composition is a single-phase liquid having a pH of 7.5 and is effective in reducing formation of dandruff in clinical tests.

When prepared by using a radioactive $C_{14}$ tagged Resin A, the composition is found to be substantive to both hair and gelatin at pH's of 9.5 and 7.5 using the described substantivity tests.

A clear liquid composition having a cloud point below 40° F. is obtained when the nonionic detergent is omitted from the shampoo composition of Example 2. Such a composition exhibits an MIC of 1.0 µg./ml. (based upon the resin weight) against *P. ovale*. The inclusion of the resin reduced the MIC of the shampoo composition from 3125 µg./ml. to 98 µg./ml.

Examples 4 to 7 describe additional cleansing compositions suitable for use as shampoos.

TABLE III

| | Weight, percent | | | |
|---|---|---|---|---|
| Example | 4 | 5 | 6 | 7 |
| Ingredient: | | | | |
| Sodium lauryl sulfate | | | 10.0 | |
| Triethanolamine lauryl sulfate | | 12.0 | | |
| Sodium lauryl ether sulfate | 8.0 | | | |
| $C_8$-$C_{18}$ alkyl dimethyl betaine | | | 10.0 | |
| Triethanolamine lauryl-myristyl amino propionate | | | | 4.2 |
| Disodium salt of 2-undecyl cycloimidium, 1-hydroxy, 1-ethoxyethanoic acid, 1-ethanoic acid | | 6.0 | | |
| Lauryl dimethyl amine oxide | 7.5 | | | 8.1 |
| Cetyl dimethyl amine oxide | | | | 2.7 |
| Dimethyl tallow alkyl amidopropyl ammonium chloride | | | | 2.7 |
| Lauric myristic diethanolamide | | | | 2.1 |
| Resin A | 1.0 | 1.0 | 1.0 | 1.0 |
| Ethanol | 10.0 | 10.0 | 10.0 | |
| Water | Bal. | Bal. | Bal. | Bal. |
| Total | 100.0 | 100.0 | 100.0 | 100.0 |
| pH | 9.3 | 8.0 | 9.0 | 9.2 |

The foregoing compositions are effective to inhibit growth of microorganisms such as *P. ovale* and exhibit desired cosmetic properties.

Example 8 sets forth a cleansing composition suitable for use as a shampoo, and Examples 9–12 set forth other suitable cleansing compositions. All of these compositions are prepared by adding an aqueous solution containing 40.2% by weight of Resin A to the aqueous mixture of the other ingreients with agitation at 78° F. The pH of compositions 10 and 11 is adjusted to 7.2 using 10% aqueous hydrochloric acid. The unadjusted pH of Example 12 is 7.2.

Example 8

| | Percent by weight |
|---|---|
| Sodium lauryl sulfate | 27.0 |
| Linear hexylbenzene sulfonate | 1.0 |
| Resin A | 1.0 |
| Water, balance | |
| | 100.0 |

MIC of composition=0.49 μg./ml. (based upon the resin).
MIC of composition without APU=250 μg./ml.

EXAMPLES 9 TO 12

| Example | 9 | 10 | 11 | 12 |
|---|---|---|---|---|
| $C_8$–$C_{18}$ amidopropyl betaine | 20 | | | |
| Lauryl dimethyl amine oxide | | 20 | | |
| Block copolymer of propylene oxide-ethylene oxide (20% by weight)—m:w=2,200 | | | 20 | |
| Sodium N-lauryl-myristyl beta-aminopropionate | | | | 20 |
| Ethanol | 10 | 10 | 10 | 10 |
| Water | Bal. | Bal. | Bal. | Bal. |
| Total | 100 | 100 | 100 | 100 |

These compositions are similarly effective and exhibit desired cosmetic properties.

Example 13

(Detergent Bar)

| | Percent |
|---|---|
| Sodium N lauryl B-iminodipropionate | 8.75 |
| Sodium $C_{10}$–$C_{20}$ alkane sulfonate | 24.25 |
| Sodium tallow soap | 26.40 |
| Sodium Tridecylbenzene sulfonate | 7.30 |
| Syrupy phosphoric acid (85%) | 7.30 |
| Stearic acid | 3.60 |
| Resin A | 8.10 |
| Water, balance | |
| | 100.0 |

The detergent bar is prepared by admixing 20 parts by weight of 40.2 percent Resin A solution with 80 parts by weight of a particular mixture of the other ingredients containing about 3 percent moisture, milling on a three-roll mill and plodding at about 110° F. to yield a rod for cutting into bars. This bar is effective against *Staph. aureus* and *P. ovale* when used for washing hands.

Example 14 sets forth a single-phase hair tonic.

Example 14

| | Percent |
|---|---|
| Ethanol | 60.0 |
| 2,2′, 4,4′ tetrahydroxybenzophenone | 0.2 |
| Polypropoxylated butanol having a mol. wt. of 2500 | 1.75 |
| Polypropoxylated butanol having a mol. wt. of 2000 | 0.5 |
| Copolymer of ethylene oxide and propylene oxide on butanol having a molecular weight 1500 (50% E+O and 50% PrO) | 15.75 |
| Perfume | 0.5 |
| 1% color solution | 0.1 |
| Resin A | 0.5 |
| Water, balance | |
| Total | 100.0 |

Other hair-grooming preparations which are effective against *P. ovale* are set forth in Examples 15–17.

Example 15

Hair Tonic

| | |
|---|---|
| Ethyl alcohol 96% | 80.0 |
| Isopropyl myristate | 10.0 |
| Resin A | 1.0 |
| Perfume, coloring | 0.4 |
| Water | 8.6 |
| Total | 100.0 |

Example 16

Hair Cream (Oil-in-water emulsion)

Part I:
| | |
|---|---|
| Mineral oil | 40.0 |
| White Petrolatum | 5.0 |
| Stearic Acid | 3.0 |
| Cetyl Alcohol | 1.5 |
| Preservative | 0.2 |

Part II:
| | |
|---|---|
| Triethanolamine | 1.3 |
| Resin A | 1.0 |
| Water | 47.7 |

Part III:
| | |
|---|---|
| Perfume | 0.3 |

Part I is heated to 65° C. and slowly added with thorough stirring to part II previously heated to 60° C. The cream is cooled with stirring to 40° C. at which temperature part III is added.

Example 17

Hair Cream (Water-in-oil emulsion)

Part I:
| | |
|---|---|
| White petrolatum | 7.5 |
| Mineral oil | 37.5 |
| Lanolin anhydrous | 3.0 |
| Sorbitan sesquioleate | 3.0 |
| Beeswax | 2.0 |
| Preservative | 0.2 |

Part II:
| | |
|---|---|
| Borax | 0.5 |
| Resin A | 1.5 |
| Water | 44.5 |

Part III:
| | |
|---|---|
| Perfume | 0.3 |

Components of Part I are combined by melting together at 75° C. Then Part II previously heated to 75° C. is added with stirring at this temperature. The cream is stirred for 10 minutes at 70–75° C. and then cooled slowly with stirring to 45° C. At this temperature Part III is added. After cooling with stirring to 30° C. the cream is homogenized.

Example 18
(Hairspray)

| | |
|---|---|
| Resin A | 0.25 |
| Polyvinylpyrrolidone (NP-K-30) | 1.13 |
| Polypropoxylated monooleate (mol. wt. 2000) | 7.70 |
| Perfume | 0.23 |
| Ethanol | 65.09 |
| Freon 12® ($CCl_2F_2$) | 25.00 |
| | 100.00 |

When resins having an average molecular weight in the range of 1,000 to 20,000 and a repeating unit of

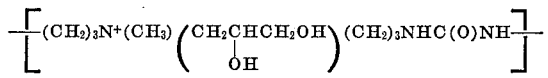

or

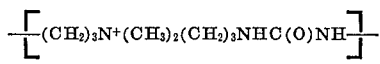

or

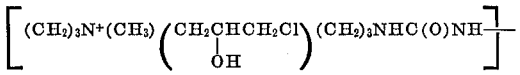

or

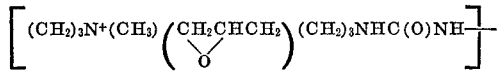

are substituted for the resin in the compositions of Examples 8–17, substantially similar results are obtained.

Although the present invention has been described with reference to particular embodiments and examples, it will be apparent to those skilled in the art that similar results may be obtained when the aminopolyureylene resin is used in combination with a wide variety of water-soluble and water-insoluble substances in adition to those specifically described.

What is claimed is:

1. A method of improving the condition of the hair and skin which comprises the step of applying thereto a conditioning amount of a composition comprising (I) a water-soluble aminopolyurea resin conditioning agent having a molecular weight in the range of 300 to 100,000 and having the following repeating unit:

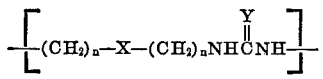

wherein X is NH, N—$C_1$ to $C_{22}$ alkyl,

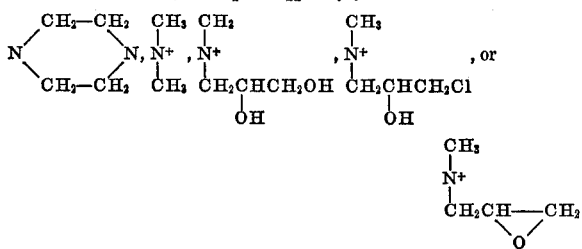

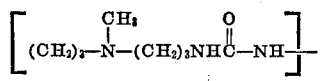

Y is O or S, and $n$ is 2 or 3; and (II) a compatible, nontoxic cosmetic vehicle.

2. A method in accordance with claim 1 wherein said repeating unit is

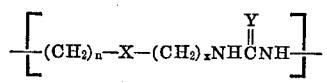

and is present in an amount of from about 0.25 to 10 percent by weight, said amount being effective to inhibit the growth of *Staphylococcus aureus* and *Pityrosporum ovale*.

3. A method in accordance with claim 2 wherein said resin has an average molecular weight of 1,000 to 20,000.

4. A method in accordance with claim 1 wherein said vehicle is an aqueous monohydric or polyhydric alkanol containing 2 to 3 carbon atoms.

5. A method in accordance with claim 1 wherein said vehicle is a cleansing composition comprising about 5% to 99% by weight of a water-soluble synthetic organic detergent.

6. A method in accordance with claim 5 wherein said vehicle is an aqueous cleansing composition consisting essentially of 5% to 40% by weight of said detergent.

7. A method in accordance with claim 1 wherein said vehicle is an aqueous hair-grooming composition comprising about 0.5 to 65% by weight of a substantially nonvolatile organic hair-grooming agent selected from the group consisting of mineral oil, castor oil, polyhydric alcohols containing 2 to 3 carbon atoms, $C_1$-$C_3$ alkyl and hydroxyalkyl esters of $C_8$-$C_{18}$ fatty acids, mixed polyethylene glycol polypropylene glycol condensates on butanol having a molecular weight of from 400 to 4,000 and lower alkoxy propylene glycols having a molecular weight in the range of 1,000 to 2,500.

8. A cosmetic composition for improving the condition of the hair and skin in the form of a shampoo, detergent bar, hair tonic, hair cream or hair spray which consists essentially of (I) 0.25% to 10% by weight of a water-soluble aminopolyurea resin having a molecular weight in the range of about 300 to 100,000 and having the following repeating unit:

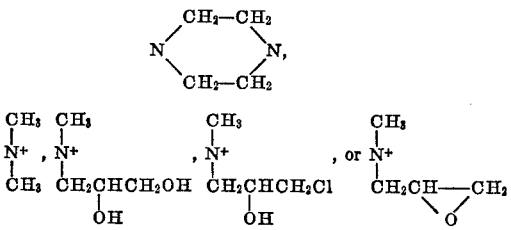

wherein X is NH, N—$C_1$ to $C_{22}$ alkyl,

Y is O or S, and $n$ is 2 or 3; and (II) 90% to 99.75% by weight of a compatible, nontoxic cosmetic vehicle containing a cleansing agent or a hair-grooming agent.

9. A composition according to claim 8 wherein said resin is present in an amount of 1% to 10% by weight, and said vehicle comprises 5% to 95% by weight of the composition of a compatible, water-soluble synthetic organic detergent, said composition being suitable for use in cleansing the hair and scalp.

10. A composition according to claim 9 wherein said vehicle is an aqueous vehicle containing 5% to 40% by weight of said detergent.

11. A composition according to claim 9 wherein said resin has an average molecular weight in the range of 1,000 to 20,000 and said repeating unit is

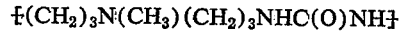

or

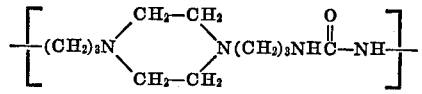

12. A composition according to claim 10 wherein said organic detergent is selected from the group consisting of N-alkyl dimethyl betaines, N-alkyl dimethyl sulfobetaines, N-alkyl aminocarboxylates, C-alkyl imidazole derivatives having the following formulas:

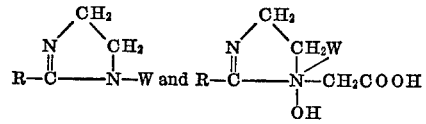

wherein R is alkyl of about 7 to 17 carbon atoms, W is selected from the group consisting of $R_2OH$, $R_2COOM$, and $R_2OR_2COOM$, wherein M is selected from the group consisting of sodium, potassium, ammonium and alkylolammonium and $R_2$ is methylene or ethylene, N-alkyl dimethyl amine oxides and mixtures thereof, said alkyl group containing from 8 to 18 carbon atoms.

13. A cosmetic, hair-grooming composition consisting essentially of from about 0.25% to 10% by weight of (I) a water-soluble aminopolyurea resin having a molecular weight in the range of 300 to 100,000 and the following repeating unit

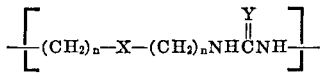

wherein X is NH, N—$C_1$ to $C_{22}$ alkyl,

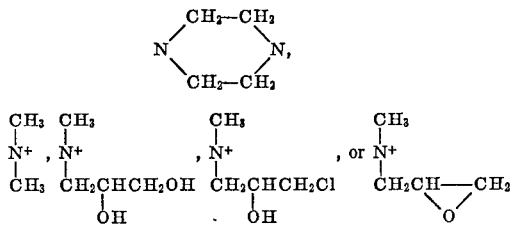

Y is O or S, and $n$ is 2 or 3; and (II) 90% to 99.75% by weight of an aqueous vehicle containing 0.5 to 65% by weight of the composition of a nontoxic, substantially nonvolatile hair-grooming agent selected from the group consisting of mineral oil, castor oil, polyhydric alcohols containing 2 to 3 carbon atoms, $C_1$-$C_3$ alkyl and hydroxyalkyl esters of $C_8$-$C_{18}$ fatty acids, mixed polyethylene glycol polypropylene glycol condensates on butanol having a molecular weight of from 400 to 4,000 and lower alkoxy propylene glycols having a molecular weight in the range of 1,000 to 2,500.

14. A composition in accordance with claim 13 wherein said resin has an average molecular weight of 1,000 to 20,000 and said repeating unit is

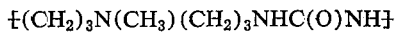

or

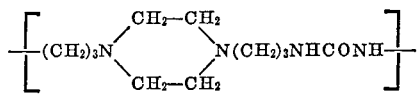

15. A composition in accordance with claim 14 wherein said hair-grooming agent is a mineral oil.

16. A composition in accordance with claim 14 wherein said hair-grooming agent is selected from the group consisting of lower alkoxypolypropylene glycols having a molecular weight from 1,000 to 2,500 and mixed polyethylene glycol polypropylene glycols having a molecular weight in the range of 400 to 4,000 and is present in an amount of 3% to 30% by weight and said agent is solubilized in an aqueous vehicle containing from about 30% to 80% by weight of ethanol based upon the total composition.

17. A composition according to claim 8 wherein said vehicle is an aqueous monohydric and polyhydric alkanol containing 2 to 3 carbon atoms.

References Cited
UNITED STATES PATENTS

| | | | |
|---|---|---|---|
| 2,501,783 | 3/1950 | Morgan | 260—77.5 C |
| 2,698,787 | 1/1955 | Schiller et al. | 260—77.5 C |
| 2,963,465 | 12/1960 | van der Kerk | 260—77.5 C |
| 2,973,342 | 2/1961 | Inaba et al. | 260—77.5 C |
| 3,185,656 | 5/1965 | Gabler et al. | 260—77.5 C X |
| 3,390,137 | 6/1968 | Kirshenbaum et al. | 260—77.5 C |
| 3,412,072 | 11/1968 | Bouboulis et al. | 260—77.5 C |
| 3,580,853 | 5/1971 | Parran | 424—78 X |

ALBER T. MEYERS, Primary Examiner

N. A. DREZIN, Assistant Examiner

U.S. Cl. X.R.

424—47, 48, Dig. 1, Dig. 2, Dig. 4